(12) United States Patent
Nomaru et al.

(10) Patent No.: US 11,032,456 B2
(45) Date of Patent: Jun. 8, 2021

(54) ULTRAFAST IMAGING APPARATUS

(71) Applicant: DISCO CORPORATION, Tokyo (JP)

(72) Inventors: Keiji Nomaru, Tokyo (JP); Yusaku Ito, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 16/829,213

(22) Filed: Mar. 25, 2020

(65) Prior Publication Data

US 2020/0322510 A1 Oct. 8, 2020

(30) Foreign Application Priority Data

Apr. 3, 2019 (JP) .............................. JP2019-071419

(51) Int. Cl.
*H04N 5/225* (2006.01)
*G03B 39/00* (2021.01)

(52) U.S. Cl.
CPC ......... *H04N 5/2256* (2013.01); *G03B 39/005* (2013.01); *G03B 2215/05* (2013.01)

(58) Field of Classification Search
None
See application file for complete search history.

(56) References Cited

U.S. PATENT DOCUMENTS

| 2016/0377412 | A1* | 12/2016 | Li | G01B 11/0608 356/630 |
| 2018/0367717 | A1* | 12/2018 | Liao | G02B 21/26 |
| 2020/0322510 | A1* | 10/2020 | Nomaru | G03B 39/005 |
| 2020/0371044 | A1* | 11/2020 | Yoo | G06T 3/4038 |

FOREIGN PATENT DOCUMENTS

JP 2014221483 A 11/2014

* cited by examiner

*Primary Examiner* — William B Perkey
(74) *Attorney, Agent, or Firm* — Greer Burns & Crain Ltd.

(57) ABSTRACT

An imaging unit for an ultrafast imaging apparatus includes an objective lens opposing a workpiece supported on a chuck table, a beam splitter disposed in a first optical path extending from the objective lens, an image processing unit disposed in a second optical path extending from the beam splitter, and an illumination unit disposed in a third optical path extending from the beam splitter. The illumination unit includes a broadband pulsed light source, and a spectrometer configured to divide a single pulse of light, which has been emitted from the broadband pulsed light source, into a plurality of wavelengths and to produce a time lag between each two adjacent ones of the plurality of wavelengths.

5 Claims, 4 Drawing Sheets

ULTRAFAST IMAGING APPARATUS

BACKGROUND OF THE INVENTION

Field of the Invention

The present invention relates to an ultrafast imaging apparatus that successively captures, at high speed, images of a workpiece supported on a support unit.

Description of the Related Art

A workpiece with a plurality of devices such as integrated circuits (ICs) or large-scale integrations (LSIs) formed on a surface thereof and defined by a plurality of intersecting division lines is divided into individual device chips by a dicing machine provided with a cutting blade, a laser processing machine provided with a laser condenser, or the like. The divided device chips are used in electronic equipment such as mobile phones and personal computers.

With cutting machines, attempts have been being made to verify a mechanism during application of cutting by successively capturing images of a cutting blade and a workpiece with a so-called high-speed camera. If the rpm of the cutting blade is, for example, approximately 30,000 rpm and the capturing frame rate of the high-speed camera is, for example, 45,000 frames/sec, a state during one rotation of the cutting blade can be captured in images of approximately 90 frames, and therefore the state of the cutting by the cutting blade can be sufficiently verified.

SUMMARY OF THE INVENTION

On the other hand, for example, when verifying a mechanism upon formation of a machining mark by performing machining with an applied laser beam (see, for example, JP 2014-221483 A) or verifying a mechanism about how a crack propagates and grows upon development of the crack by performing a non-destructive test, the mechanism cannot be sufficiently verified because conventionally-known general high-speed cameras such as that described above have an optical resolution of at most several tens thousands of frames/sec or so. There is accordingly an outstanding demand for an ultrafast imaging apparatus that can capture images with still higher resolution.

It is therefore an object of the present invention to provide an ultrafast imaging apparatus that can capture images with still higher resolution.

In accordance with an aspect of the present invention, there is provided an ultrafast imaging apparatus including a chuck table configured to support a workpiece thereon, and an imaging unit configured to capture images of the workpiece supported on the chuck table. The imaging unit includes an objective lens opposing the workpiece supported on the chuck table, a beam splitter disposed in a first optical path extending from the objective lens, an image processing unit disposed in a second optical path extending from the beam splitter, and an illumination unit disposed in a third optical path extending from the beam splitter. The illumination unit includes a broadband pulsed light source, and a spectrometer configured to divide a single pulse of light, which has been emitted from the broadband pulsed light source, into a plurality of wavelengths and to produce a time lag between each two adjacent ones of the plurality of wavelengths. The image processing unit includes a diffraction grating configured to divide and diffract return light, which has been reflected by the workpiece supported on the chuck table after application of illumination light onto the workpiece with the time lag from the illumination unit, at different angles according to the wavelengths, and an image sensor configured to capture the images, like a time-resolved photo, of the return light, which has been divided and diffracted by the diffraction grating, at areas for the respective angles corresponding to the wavelengths.

Preferably, the ultrafast imaging apparatus further includes storage means for storing the images captured by the image sensor, and display means for displaying the images stored in the storage means.

Preferably, the diffraction grating includes a first diffraction grating and a second diffraction grating, the first diffraction grating is configured to divide and diffract the return light at the different angles according to the wavelengths, and the second diffraction grating is configured to convert the return light, which has been divided and diffracted by the first diffraction grating, into parallel light and to guide the parallel light to the image sensor. Preferably, the image processing unit further includes a reflection mirror and a collimation lens, and the diffraction grating is configured to divide and diffract the return light, which has been reflected at predetermined angles by the reflection mirror, at different angles according to the wavelengths and to guide the resulting divided return light to the image sensor through the collimation lens.

Preferably, the spectrometer includes an illumination diffraction grating configured to divide and diffract the single pulse of light at the different angles according to the plurality of wavelengths, a delay line having different optical path lengths according to the wavelengths divided by the illumination diffraction grating so that a time lag is produced between each two adjacent ones of the plurality of wavelengths, and a multiplexer that multiplexes separate light beams delayed according to the wavelengths by the delay lines.

According to the present invention, return light, which has been reflected by the workpiece after application of illumination light onto the workpiece with a time lag of, for example, 10 ns, can be divided and diffracted at different angles according to the wavelengths, and the resulting, divided and diffracted return light can be captured as images like a time-resolved photo at areas for the respective angles corresponding to the wavelengths. It is hence possible to easily acquire an ultrafast image of 10 ns/sec, in other words, one one-hundred-millionth.

The above and other objects, features and advantages of the present invention and the manner of realizing them will become more apparent, and the invention itself will best be understood from a study of the following description and appended claims with reference to the attached drawings depicting or illustrating a preferred embodiment of the invention.

DETAILED DESCRIPTION OF THE PREFERRED EMBODIMENT

Figure 1:
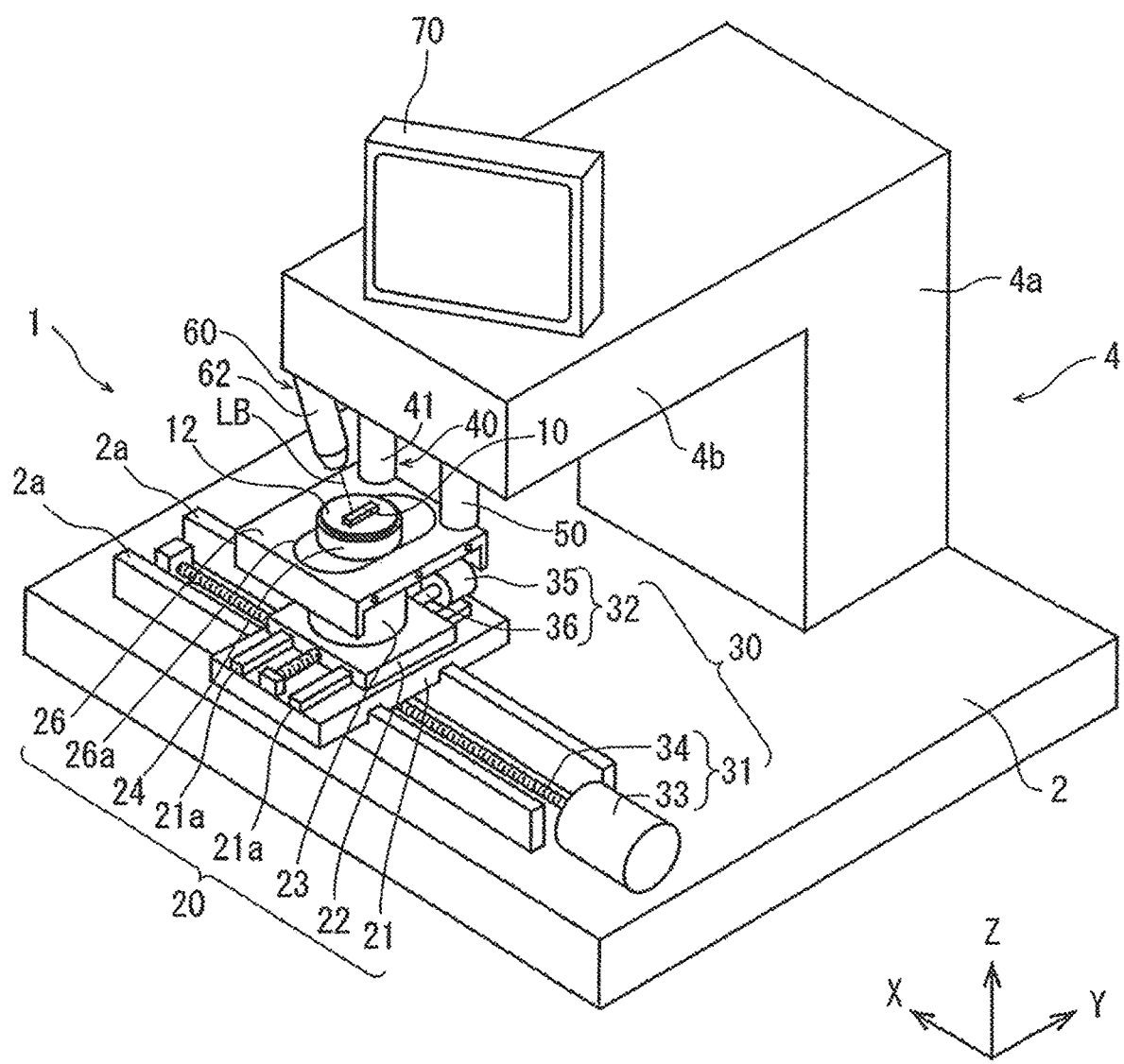
FIG. 1 is a perspective view of an ultrafast imaging apparatus according to an embodiment of the present invention.

With reference to the attached drawings, a description will hereinafter be made in detail about an ultrafast imaging apparatus 1 according to an embodiment of the present invention. FIG. 1 presents a perspective view of the ultrafast imaging apparatus 1 of the embodiment. The ultrafast imaging apparatus 1 includes a support unit 20 that supports a workpiece 10 thereon, a moving mechanism 30 that moves the support unit 20, an imaging unit 40 that captures images of the workpiece 10, and an alignment unit 50. In this embodiment, a laser beam irradiation unit 60 is also disposed to apply a laser beam LB onto the workpiece 10, which is supported on the support unit 20, to verify a mechanism upon application of the laser beam LB onto the workpiece 10.

The support unit 20 includes a rectangular X movable plate 21, a rectangular Y movable plate 22, a cylindrical post 23, and a rectangular cover plate 26. The X movable plate 21 is mounted on a base 2 movably in an X direction indicated by an arrow X in the figure, and the Y movable plate 22 is mounted on the X movable plate 21 movably in a Y direction indicated by an arrow Y in the figure. The post 23 is fixed on an upper surface of the Y movable plate 22, and the cover plate 26 is fixed on an upper end of the post 23. Disposed on the cover plate 26 is a circular chuck table 24, which extends upward through a slot 26a formed in the cover plate 26. The chuck table 24 is configured to support the workpiece 10 thereon and to be rotatable by undepicted rotary drive means. Arranged on an upper surface of the chuck table 24 is a circular suction chuck (depiction of which is omitted in the figure) formed from a porous material and extending substantially horizontally. In FIG. 1, a circular plate 12 with the workpiece 10 centrally glued thereon is placed on the upper surface of the chuck table 24, so that the workpiece 10 is supported on the chuck table 24 via the plate 12.

The moving mechanism 30 includes an X moving mechanism 31 and a Y moving mechanism 32. The X moving mechanism 31 is disposed on the base 2, and moves the support unit 20 in the X direction, and the Y moving mechanism 32 moves the support unit 20 in the Y direction. Via a ball screw 34, the X moving mechanism 31 converts a rotational motion of a pulse motor 33 to a linear motion and transmits it to the X movable plate 21, whereby the X movable plate 21 is advanced or retracted in the X direction along guide rails 2a on the base 2. Via a ball screw 36, the Y moving mechanism 32 converts a rotational motion of a pulse motor 35 to a linear motion and transmits it to the Y movable plate 22, whereby the Y movable plate 22 is advanced or retracted in the Y direction along guide rails 21a on the X movable plate 21. Although depiction is omitted in the figure, the X moving mechanism 31, the Y moving mechanism 32 and the chuck table 24 each include position detection means, so that the positions of the chuck table 24 in the X and Y directions and the rotated position of the chuck table 24 in a circumferential direction are accurately detected. The positions of the chuck table 24 are transmitted to a control unit 100 (see FIG. 2) that will be described subsequently herein. Based on signals instructed by the control unit 100, the X moving mechanism 31 and the Y moving mechanism 32, and the undepicted rotary drive means for the chuck table 24 are driven so that the chuck table 24 can be positioned at desired coordinate positions and rotation angle.

Laterally to the moving mechanism 30, a frame 4 is disposed upright. The frame 4 includes a vertical wall portion 4a disposed on the base 2, and a horizontal wall portion 4b extending in a horizontal direction from an upper end portion of the vertical wall portion 4a. An optical system for the imaging unit 40 is incorporated in the horizontal wall portion 4b of the frame 4. With reference to the block diagram of the imaging unit 40 as presented in FIG. 2 in addition to FIG. 1, a description will be made about an outline configuration of the imaging unit 40.

The imaging unit 40 includes an objective lens 411, a beam splitter 42, an image processing unit 43A, and an illumination unit 44A. The objective lens 411 is built in an imager 41 that opposes the workpiece 10 supported on the support unit 20. The beam splitter 42 is disposed in a first optical path R1 extending from the objective lens 411. The image processing unit 43A is disposed in a second optical path R2 extending in a direction from the beam splitter 42. The illumination unit 44A is disposed in a third optical path R3 extending in another direction from the beam splitter 42.

The illumination unit 44A includes a broadband pulsed light source 441 and a spectrometer 442A. The spectrometer 442A is configured to divide a single pulse of light, which has been outputted from the broadband pulsed light source 441, into a plurality of wavelengths and to produce a time lag between each two adjacent ones of the plurality of wavelengths. The broadband pulsed light source 441 is a light source that can generate a broad spectrum of pulsed light, and can be configured, for example, from a pulsed laser oscillator, a super continuum light source, a flash lamp, or the like.

Figure 2:
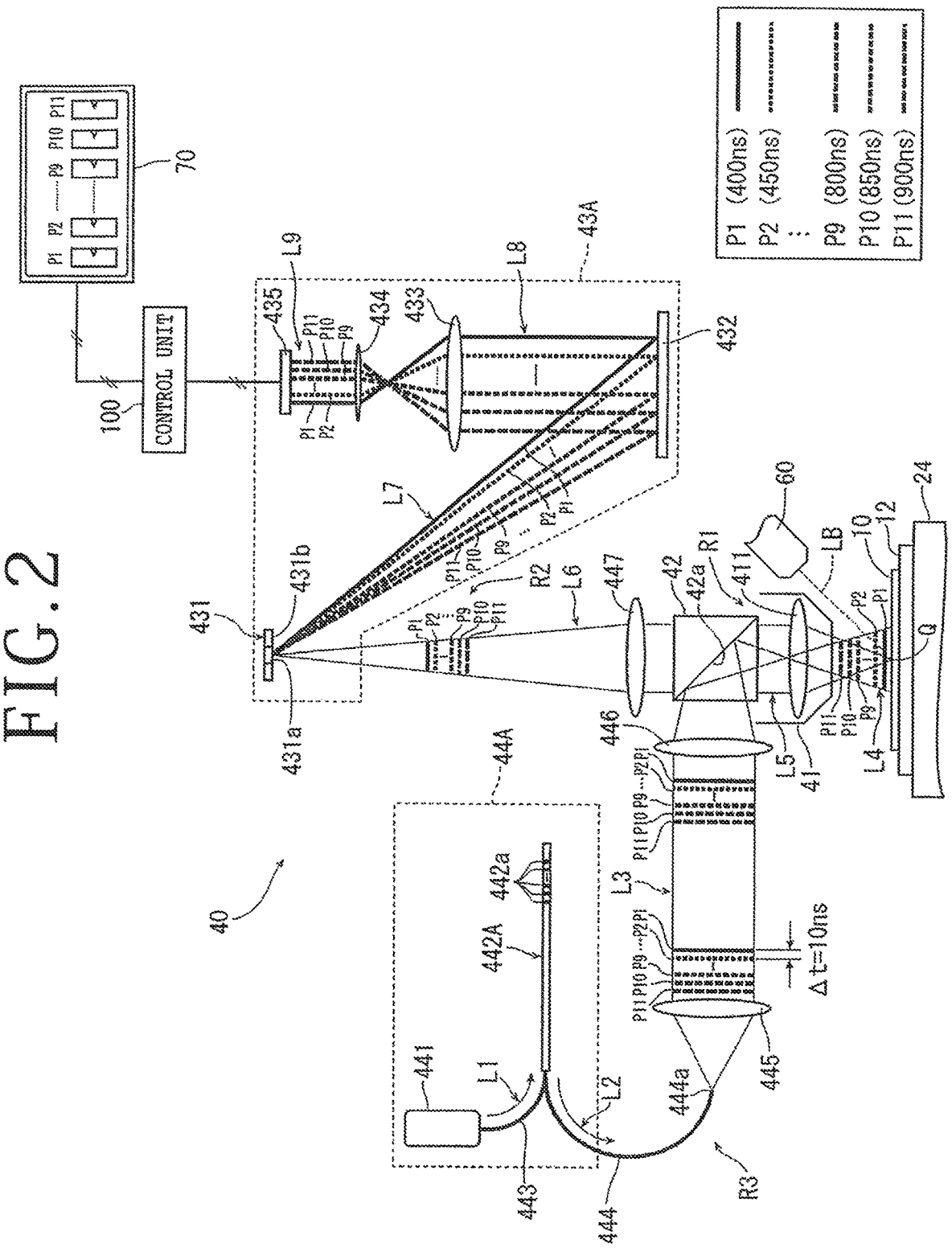
FIG. 2 is a block diagram of an imaging unit disposed in the ultrafast imaging apparatus depicted in FIG. 1.

The broadband pulsed light source 441 is configured to enable illumination of light, for example, under the following conditions:

Wavelength: 400 to 900 nm
Output: 100 W
Repetition frequency: 1 KHz to 1 MHz
Pulse width: 100 ns to 100 ps The spectrometer 442A is realized, for example, by a fiber bragg grating (FBG) depicted in FIG. 2. The FBG forms a reflecting portion 442a by a plurality of diffraction gratings engraved with a predetermined interval at predetermined positions in an optical fiber, and can reflect only light of specific wavelength components out of incident light at the reflecting portion 442a. By a plurality of reflecting portions 442a which reflect light of such predetermined wavelengths and are disposed at a predetermined distance in the optical fiber, light L1 generated from the broadband pulsed light source 441 is divided into light beams of the plural wavelengths, and the light beams divided according to the wavelengths are outputted with a time lag produced according to the predetermined distance. Described more specifically, the pulsed light L1, which is a broad spectrum of light (white light) including wavelengths of 400 to 900 nm as generated from the broadband pulsed light source 441, is introduced into the spectrometer 442A, which is configured from the FBG, through an optical fiber 443, and by the spectrometer 442A, the light L1 is divided according to the wavelengths (400 nm, 450 nm, . . . 850 nm, 900 nm) of intervals of 50 nm into light L2 composed of separate light beams P1 to P11 with a time lag of 10 ns produced between each adjacent two light beams. The light L2 divided by the spectrometer 442A is guided to an optical fiber 444 connected to the spectrometer 442A, and is outputted from an end portion 444a to an outside.

The light L2 outputted from the end portion 444a of the optical fiber 444 is converted to parallel light (collimated beam) L3 through a collimation lens 445, is converged by a condenser lens 446, and is guided to the beam splitter 42. As described above, the parallel light L3 is composed of the separate light beams P1 to P11 with the time lag of 10 ns produced according to the wavelengths. Only P1, P2, P9, P10, and P11 are presented for the convenience of description in the diagram, but P3 to P8 are also included as a matter of fact. The parallel light L3 guided to the beam splitter 42 is reflected at a predetermined ratio on an inclined surface 42a of the beam splitter 42, is guided toward the first optical path R1 including the beam splitter 42 and the objective lens 411, and is applied as illumination light L4 onto the workpiece 10 through the objective lens 411.

Return light L5, which has been reflected by the workpiece 10 after the application of the illumination light L4 onto the workpiece 10, is converted to parallel light by the objective lens 411, returns to the beam splitter 42, transmits through the inclined surface 42a of the beam splitter 42, and is converged to return light L6 by a condenser lens 447. The return light L6 is guided to the image processing unit 43A. An optical path, which extends from the beam splitter 42 and in which the image processing unit 43A is disposed, is indicated as the second optical path R2.

The image processing unit 43A is means for capturing images of the workpiece 10 based on the return light L6 reflected and transmitted from the workpiece 10, and more specifically includes a first diffraction grating 431, which divides and diffracts the return light L6, and a second diffraction grating 432. The first diffraction grating 431 converts the return light L6 to return light L7 divided and diffracted at different angles according to the wavelengths, and the second diffraction grating 432 converts the return light L7 to return light L8 adjusted to parallel light through an adjustment in angle of the return light L7 according to the wavelengths. The return light L8 is guided as return light L9, the spreading range of which has been adjusted by a condenser lens 433 and a collimation lens 434, to an image sensor 435. The image sensor 435 is connected to the control unit 100.

The control unit 100 includes a central processing unit (CPU), a read only memory (ROM), a random access memory (RAM), an input interface, and an output interface (depiction of their details is omitted in the figure). The CPU is configured of a computer, and performs arithmetic processing according to a control program. The ROM stores the control program and the like. The RAM can read and write, and is used to temporarily store captured image information and the like. Image information captured by the image sensor 435 is stored in storage means 110 configured from the memory (RAM) of the control unit 100, and can be outputted to display means 70 connected via the output interface of the control unit 100. By configuring the image processing unit 43A as described above, the image sensor 435 can capture images of the workpiece 10 like a time-resolved photo at time intervals of 10 ns based on the return light L9 reflected and transmitted from the workpiece 10. It is to be noted that diverse sensors and various operating parts disposed in the ultrafast imaging apparatus 1, for example, the X moving mechanism 31, the Y moving mechanism 32, the laser beam irradiation unit 60, and the like are also connected to the control unit 100 and are controlled by the control unit 100.

Referring back to FIG. 1 and continuing the description, an optical system (the depiction of which in the figure is omitted) of the laser beam irradiation unit 60 is also incorporated inside the horizontal wall portion 4b of the frame 4. A condenser 62, which forms a part of the laser beam irradiation unit 60, is disposed on a lower surface of a free end portion of the horizontal wall portion 4b, and an undepicted condenser lens or the like is incorporated inside the condenser 62. A laser oscillator (the depiction of which is omitted in the figure) is disposed in the laser beam irradiation unit 60, the laser beam LB outputted from the laser oscillator is converged by the condenser 62, and applied onto a predetermined irradiation position on the workpiece 10 supported on the support unit 20.

The alignment unit 50 is disposed on the lower surface of the free end portion of the horizontal wall portion 4b at a position adjacent in the X direction to the imager 41 of the imaging unit 40. The alignment unit 50 includes an illumination unit, which illuminates a visible beam, and an image sensor (charge-coupled device. (CCD)), which captures an image based on the visible beam. By capturing an image of the workpiece 10 with the alignment unit 50, an accurate positional alignment is performed between a position, an image of which is to be captured by the imager 41, and a position of the workpiece 10 supported on the chuck table 24, an image of the latter position being to be captured.

The ultrafast imaging apparatus 1 of this embodiment generally has a configuration as described above. A description will be made about procedures that capture images of a process, in which a machining mark is formed by applicating the laser beam LB onto the workpiece 10 supported on the support unit 20, like a time-resolved photo by using the ultrafast imaging apparatus 1.

As described with reference to FIG. 1, the workpiece 10 centrally glued on the circular plate 12 is provided first. The workpiece 10 is formed in the shape of a rectangular plate, and is made, for example, from silicon (Si). The circular plate with the workpiece 10 glued thereon is mounted on the chuck table 24, and undepicted suction means is operated to support the workpiece 10 under suction.

After supporting the workpiece 10 on the chuck table 24 of the support unit 20 as described above, the X moving mechanism 31 and the Y moving mechanism 32 are operated to move the chuck table 24, whereby the workpiece 10 is positioned right underneath the alignment unit 50 to detect an irradiation position where the laser beam LB is to be applied. Preferably, a desired marking is applied beforehand to the irradiation position.

Figure 3:
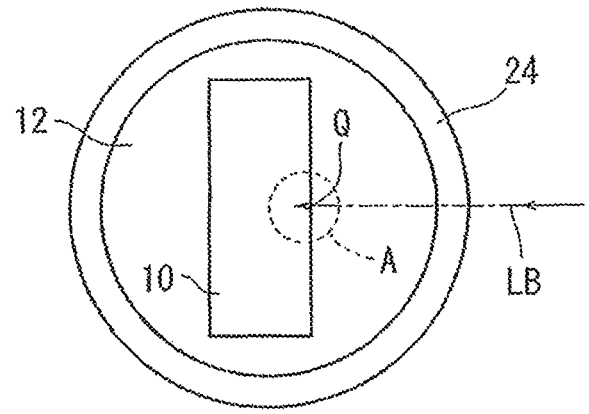
FIG. 3 is a plan view of a workpiece supported on a chuck table in the ultrafast imaging apparatus.

After performing the detection of the irradiation position by the alignment unit 50, the moving mechanism 30 is operated to position the irradiation position of the workpiece 10 right underneath the imager 41 provided with the objective lens 411. FIG. 3 depicts the workpiece 10 as seen from the side of the objective lens 411, presents an irradiation position Q of the laser beam LB to be applied by the laser beam irradiation unit 60, and also presents by a dashed line an area A where focusing is to be performed by the objective lens 411 to capture an image.

After positioning the workpiece 10 right underneath the imager 41, the illumination unit 44A of the imaging unit 40 depicted in FIG. 2 is operated. By operating the illumination unit 44A, a broad spectrum of light L1 of 100 ns pulse width is introduced into the spectrometer 442A from the broadband pulsed light source 441 via the optical fiber 443. The spectrometer 442A divides the light L1, which has been introduced into the spectrometer 442A, into light beams of wavelengths (400 nm, 450 nm, . . . 800 nm, 850 nm, 900 nm)

at 50 nm intervals and converts the light beams into light L2 with a time lag of 10 ns produced between each two adjacent ones of the divided, respective light beams, and outputs the light L2 via the optical fiber 444. The light L2 emitted from the end portion 444a of the optical fiber 444 is converted to parallel light or collimated light by the collimation lens 445, and is outputted as separate light beams P1 to P11 (parallel light L3) having wavelengths of 400 nm, 450 nm, . . . 800 nm, 850 nm, 900 nm with a time lag of 10 ns produced between each two adjacent ones of the wavelengths. From the broadband pulsed light source 441, the broad spectrum of pulsed white light L1 is repeatedly emitted according to the predetermined frequencies, and corresponding to each pulsed light L1, each light L1 is divided by the spectrometer 442A as described above.

The above-described parallel light L3 is introduced into the beam splitter 42 via the condenser lens 446, and is reflected at the predetermined ratio on the inclined surface 42a, whereby its optical path is changed toward the chuck table 24 to output light L4. The light L4 with the optical path which has been changed by the beam splitter 42 is guided to the workpiece 10 via the objective lens 411. Concurrently with this, the processing laser beam LB is applied onto the irradiation position Q of the workpiece 10 from the laser beam irradiation unit 60.

Return light L5 reflected in a range, which encompasses the area A (see FIG. 3) including the irradiation position Q where the laser beam LB was applied and a peripheral area of the area A, is converted to parallel light by the objective lens 411. The parallel light is guided to the beam splitter 42, and is allowed to transmit through the beam splitter 42. The return light L5 which has transmitted through the beam splitter 42 is converged through a condenser lens 447 into return light L6, and the return light L6 is guided to the image processing unit 43A.

The return light L6 introduced into the image processing unit 43A is first guided to the first diffraction grating 431. On the first diffraction grating 431, a central portion 431a and a masked portion 431b are formed. The central portion 431a functions as a diffraction grating, while the masked portion 431b has been subjected to masking processing so that it does not function as a diffraction grating. The masked portion 431b therefore has a function as a one-dimensional mask that restricts the area A, where the laser beam LB was applied, to only a narrower neighborhood of the irradiation position Q. The return light L6 guided to the first diffraction grating 431 is divided and diffracted as depicted in FIG. 2, and is converted to the return light L7 diffracted at different angles according to the wavelengths and having a spread.

The return light L7 divided and diffracted at the first diffraction grating 431 is guided to the second diffraction grating 432, where the return light L7 is converted to return light L8 composed of parallel, separate light beams P1 to P11 of the respective wavelengths. The return light L8, which has been reflected into parallel light by the second diffraction grating 432, is adjusted in spreading range through the condenser lens 433 and the collimation lens 434 so that it will fit to the imaging area of the image sensor 435, and is guided to the image sensor 435.

By the separate light beams P1 to P11 applied onto the workpiece 10 at the time intervals of 10 ns, the process upon application of the laser beam LB onto the workpiece 10 is transmitted as image information to the image sensor 435 in a state that the separate light beams P1 to P11 have been changed in angle by the first diffraction grating 431 and the second diffraction grating 432.

The above-described image information captured as images at the image sensor 435 is stored in the storage means 110 disposed in the control unit 100, and is also outputted to the display means 70 connected to the control unit 100, where images are successively displayed corresponding to the separate light beams P1 to P11 as depicted in FIG. 2. The separate light beams P1 to P11 have captured at every 10 ns the area A including the irradiation position of the workpiece 10, and output changes, which took place over a time of 100 ns in total, like a time-resolved photo at intervals of 10 ns. In other words, the resolution of a time-resolved photo that can be captured by the image processing unit 43A is 10 ns/sec. Therefore, the time-resolved photo is an ultrafast image having a resolution of one one-hundred-millionth, and enables a precise verification of a mechanism upon high-speed processing of the workpiece 10 with the laser beam LB. It is also possible to verify a mechanism upon continuous processing of the workpiece 10 by appropriately adjusting the repetition frequency of the broadband pulsed light source 441 and the time interval to be produced between each two adjacent ones of the separate light beams P1 to P11 by the spectrometer 442A.

The present invention is not limited to the embodiment described above, and provides a variety of modifications. The image processing unit 43A disposed in the imaging unit 40 depicted in FIG. 2 is configured so that return light reflected by the workpiece 10 after application of illumination light onto the workpiece 10 is divided and diffracted at different angles according to the wavelengths. The present invention is not limited to this configuration, and can adopt another image processing unit 43B depicted in FIG. 4. An imaging unit 40 that has adopted the other image processing unit 43B depicted in FIG. 4 has a similar configuration as the imaging unit 40 depicted in FIG. 2 except for the other image processing unit 43B depicted in FIG. 4, and therefore any repetitive description is omitted herein about the similar configuration. In the image processing unit 43B depicted in FIG. 4, a reflection mirror 45 and a third diffraction grating 46 are disposed instead of the first diffraction grating 431 and the second diffraction grating 432 depicted in FIG. 2. The reflection mirror 45 reflects the return light L6 introduced into the image processing unit 43B and including the separate light beams P1 to P11 divided according to the wavelengths (400 nm, 450 nm, . . . 850 nm, 900 nm) of intervals of 50 nm, whereby the direction of the optical path of the return light L6 is adjusted to convert the return light L6 to return light L7B. On the reflection mirror 45, a central portion 45a and a masked portion 45b are also formed. The central portion 45a functions as a reflection mirror, while the masked portion 45b has been subjected to masking processing so that it does not function as a reflection mirror. The masked portion 45b therefore has a function as a one-dimensional mask that restricts the imaging area from the area A, where the laser beam LB was applicated, to a smaller area.

Figure 4:
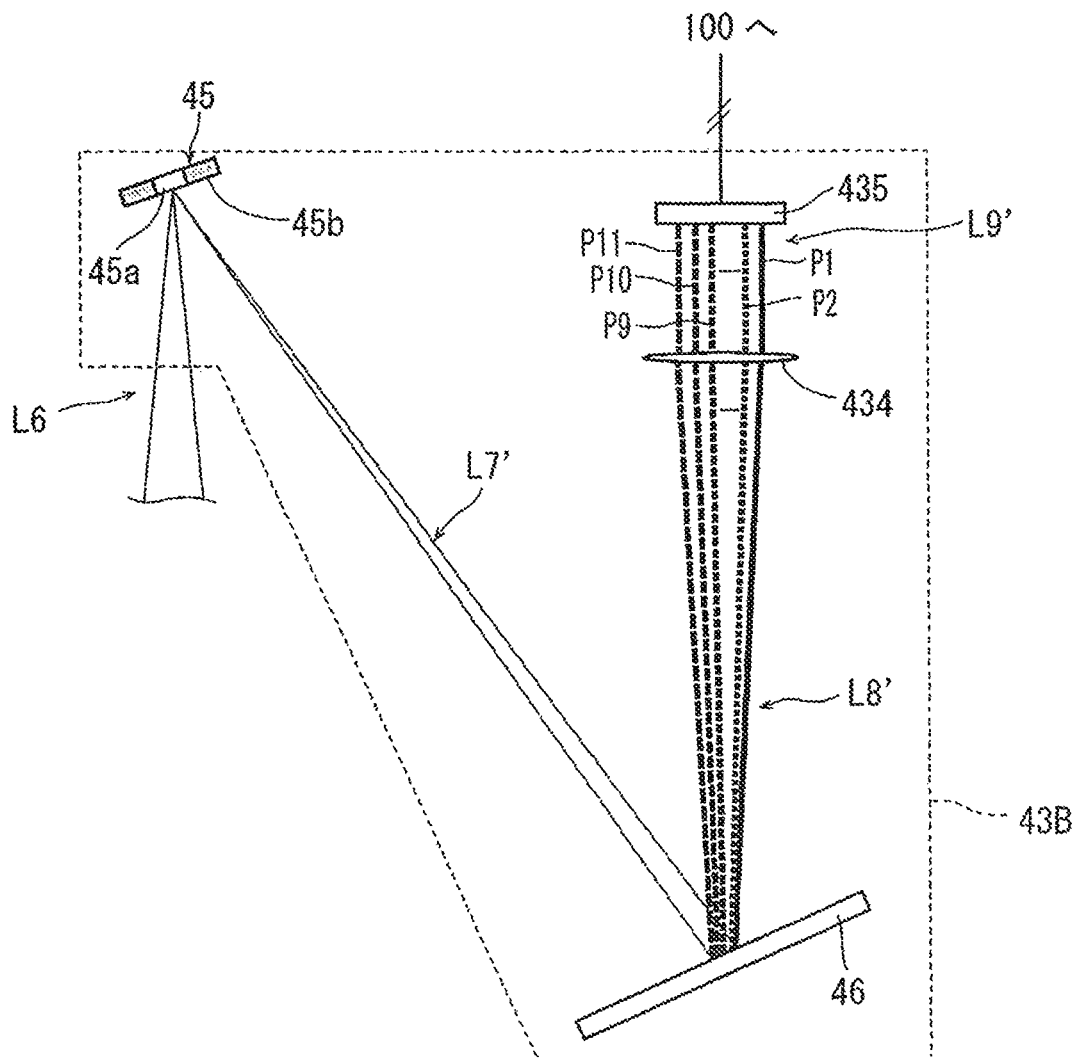
FIG. 4 is a diagram illustrating a modification of an image processing unit disposed in the imaging unit depicted in FIG. 2.

The return light L7B is guided to a third diffraction grating 46, and the return light L7B guided to the third diffraction grating 46 is divided and diffracted as presented in FIG. 4 and is converted to return light L8B diffracted at different angles according to the wavelengths and having a spread. The return light L8B is converted to parallel light by the collimation lens 434, and the parallel light is guided as return light L9B to the image sensor 435 and is captured as image information. As in the embodiment described above, the image information captured by the image sensor 435 is transmitted to the control unit 100, is stored in the storage means 110 disposed in the control unit 100, and is also outputted to the display means 70 connected to the control unit 100, where corresponding to the separate light beams P1 to P11, the image information is displayed as images captured like a time-resolved photo at intervals of 10 ns as depicted in FIG. 2.

Figure 5:
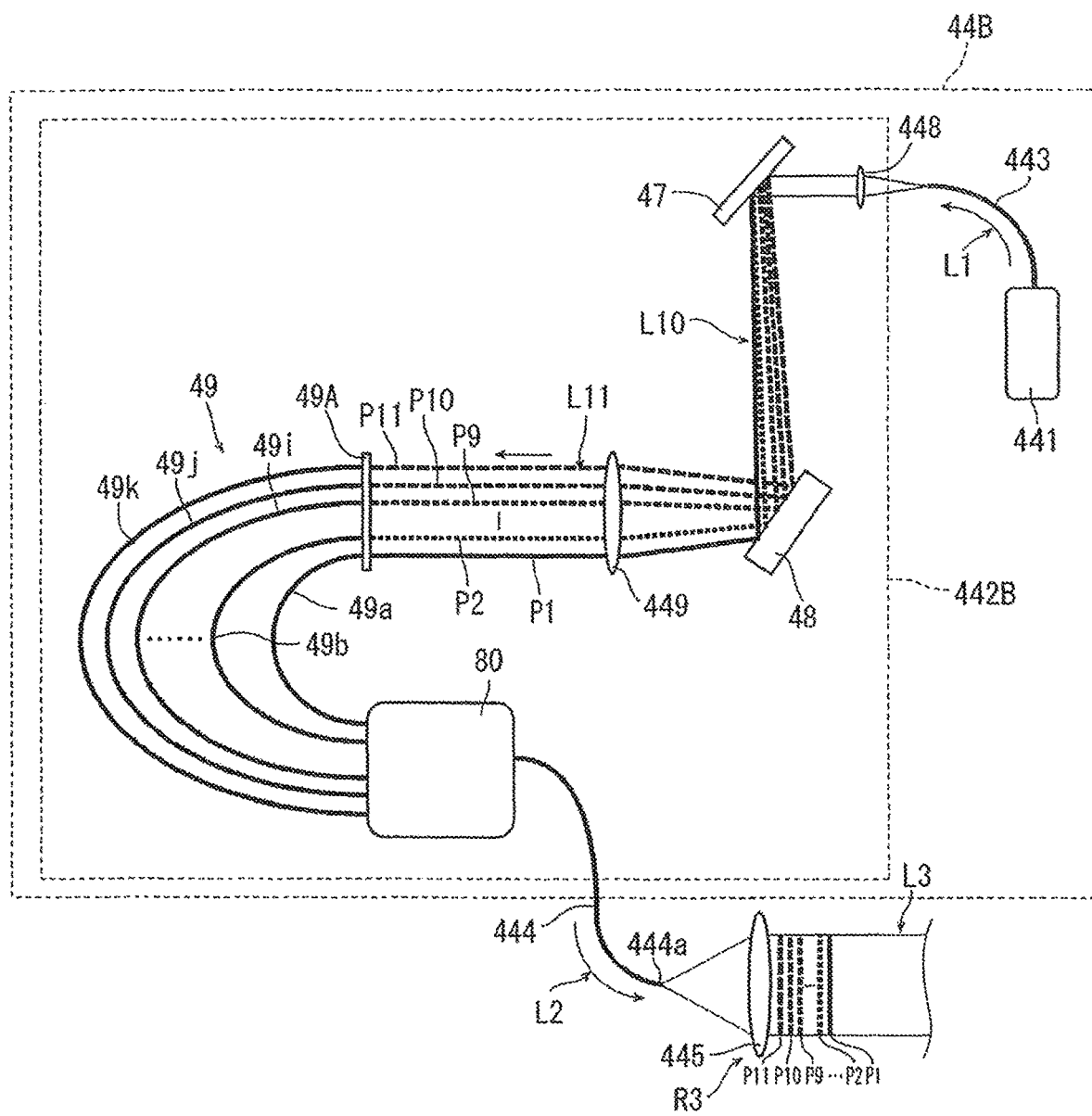
FIG. 5 is a diagram illustrating a modification of an illumination unit disposed in the imaging unit depicted in FIG. 2.

In addition, the present invention can also adopt another illumination unit 44B, which is depicted in FIG. 5, instead of the illumination unit 44A in the embodiment described above. With reference to FIG. 5, a description will be made about the other illumination unit 44B.

In the illumination unit 44B depicted in FIG. 5, the broadband pulsed light source 441 is also disposed as in the illumination unit 44A. The broad spectrum of light L1 emitted from the broadband pulsed light source 441 is introduced into a spectrometer 442B via the optical fiber 443. The light L1 introduced into the spectrometer 442B is converted to parallel light by a collimation lens 448 disposed in the spectrometer 442B, and is guided to a fourth diffraction grating (illumination diffraction grating) 47. The light L1 guided to the fourth diffraction grating 47 is changed in angle according to the wavelengths by the fourth diffraction grating 47, and is converted to light L10 including separate light beams P1 to P11 divided and diffracted according to the wavelengths (400 nm, 450 nm, ... 850 nm, 900 nm) of intervals of 50 nm, and the light L10 is guided to a reflection mirror 48. In FIG. 5, only optical axes of the respective wavelengths are presented. Actually, however, the separate light beams P1 to P11 are emitted as light with an angle thereof successively changed according to the wavelengths.

The light L10 reflected by the reflection mirror 48 is converted to parallel light L11 by a collimation lens 449, and the parallel light L11 is guided to an entrance portion 49A of a delay line 49 which has different optical path lengths according to the wavelengths divided and diffracted by the fourth diffraction grating 47 so that a time lag is produced between each two adjacent ones of the wavelengths. The delay line 49 is configured from eleven optical fibers 49a to 49k having different lengths, and the separate light beams P1 to P11, which have been divided and diffracted at different angles by the fourth diffraction grating 47 according to the wavelengths (400 nm, 450 nm, ... 850 nm, 900 nm) of intervals of 50 nm, are introduced into the optical fibers 49a to 49k, respectively. The separate light beams P1 to P11 introduced into the delay line 49 travel through the optical fibers 49a to 49k that make up the delay line 49, and are introduced into a multiplexer 80.

The optical fibers 49a to 49k that make up the delay line 49 are configured so that the optical fiber 49a is shortest, the optical fiber 49b, the optical fiber 49c, ... become longer in this order, and the optical fiber 49k is longest. Here, the difference in length between each two adjacent optical fibers is set so that the corresponding separate light beams entered the entrance portion 49A at the same time reach the multiplexer 80 with a time lag of 10 ns therebetween. The separate light beams P1 to P11 introduced into the multiplexer 80 are multiplexed at the multiplexer 80, outputted as light L2 from the end portion 444a of the optical fiber 444, and guided to the collimation lens 445 of the imaging unit 40. The above-described multiplexer 80 can be configured from a known fiber coupler, integration rod, or the like. By this illumination unit 44B, exactly the same function as the illumination unit 44A described with reference to FIG. 2 can also be exhibited.

In the above-described embodiment, the laser beam irradiation unit 60 is disposed in the ultrafast imaging apparatus 1 to capture images of a process in which a machining mark is formed by applicating the laser beam LB onto the workpiece 10 from the laser beam irradiation unit 60. In this invention, however, the disposition of the laser beam irradiation unit 60 in the ultrafast imaging apparatus 1 is not absolutely needed, and the laser beam irradiation unit 60 may be provided separately from the ultrafast imaging apparatus 1. Further, as means for applying processing to the workpiece 10 supported on the ultrafast imaging apparatus 1, the inclusion of the laser beam irradiation unit 60 is not absolutely needed, and a device that applies an impact to the workpiece 10 may be incorporated to capture images of a development process of a crack. Accordingly, the means disposed to capture images of a cutting process shall not be limited to any particular means.

The present invention is not limited to the details of the above-described preferred embodiment. The scope of the invention is defined by the appended claims and all changes and modifications as fall within the equivalence of the scope of the claims are therefore to be embraced by the invention.

What is claimed is:

1. An ultrafast imaging apparatus comprising:
   a chuck table configured to support a workpiece thereon; and
   an imaging unit configured to capture images of the workpiece supported on the chuck table, wherein
   the imaging unit includes:
      an objective lens opposing the workpiece supported on the chuck table,
      a beam splitter disposed in a first optical path extending from the objective lens,
      an image processing unit disposed in a second optical path extending from the beam splitter, and
      an illumination unit disposed in a third optical path extending from the beam splitter,
      the illumination unit including
      a broadband pulsed light source, and
      a spectrometer configured to divide a single pulse of light, which has been emitted from the broadband pulsed light source, into a plurality of wavelengths and to produce a time lag between each two adjacent ones of the plurality of wavelengths, and
      the image processing unit including
      a diffraction grating configured to divide and diffract return light, which has been reflected by the workpiece supported on the chuck table after application of illumination light onto the workpiece with the time lag from the illumination unit, at different angles according to the wavelengths, and
      an image sensor configured to capture images, like a time-resolved photo, of the return light, which has been divided and diffracted by the diffraction grating, at areas for the respective angles corresponding to the wavelengths.

2. The ultrafast imaging apparatus according to claim 1, further comprising:
   storage means for storing the images captured by the image sensor, and
   display means for displaying the images stored in the storage means.

3. The ultrafast imaging apparatus according to claim 1, wherein
   the diffraction grating includes a first diffraction grating and a second diffraction grating, the first diffraction grating is configured to divide and diffract return light at the different angles according to the wavelengths, and the second diffraction grating is configured to convert the return light which has been divided and diffracted by the first diffraction grating into parallel light and to guide the parallel light to the image sensor.

4. The ultrafast imaging apparatus according to claim 1, wherein the image processing unit further includes a reflection mirror and a collimation lens, and the diffraction grating is configured to divide and diffract the return light which has been reflected at predetermined angles by the reflection mirror at different angles according to the wavelengths and to guide the resulting divided return light to the image sensor through the collimation lens.

5. The ultrafast imaging apparatus according to claim 1, wherein the spectrometer includes an illumination diffraction grating configured to divide and diffract the single pulse of light at the different angles according to the plurality of wavelengths, a delay line having different optical path lengths according to the wavelengths divided and diffracted by the illumination diffraction grating so that a time lag is produced between each two adjacent ones of the plurality of wavelengths, and a multiplexer that multiplexes separate light beams delayed according to the wavelengths by the delay lines.

\* \* \* \* \*